May 30, 1967  J. D. CHRISTENSON  3,322,185
METHOD OF MAKING ELECTRICAL DISCHARGE MACHINING ELECTRODES
Filed April 22, 1963  2 Sheets-Sheet 1

INVENTOR.
Jack D. Christenson
BY
ATTORNEY

May 30, 1967  J. D. CHRISTENSON  3,322,185
METHOD OF MAKING ELECTRICAL DISCHARGE MACHINING ELECTRODES
Filed April 22, 1963  2 Sheets-Sheet 2
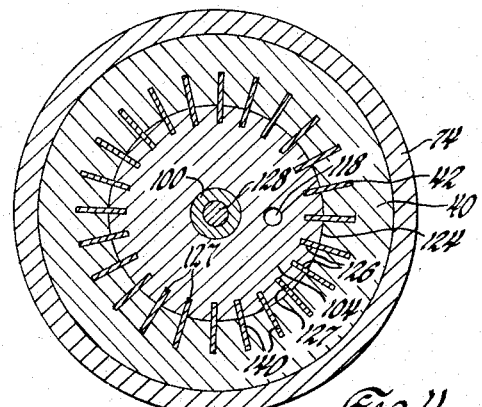
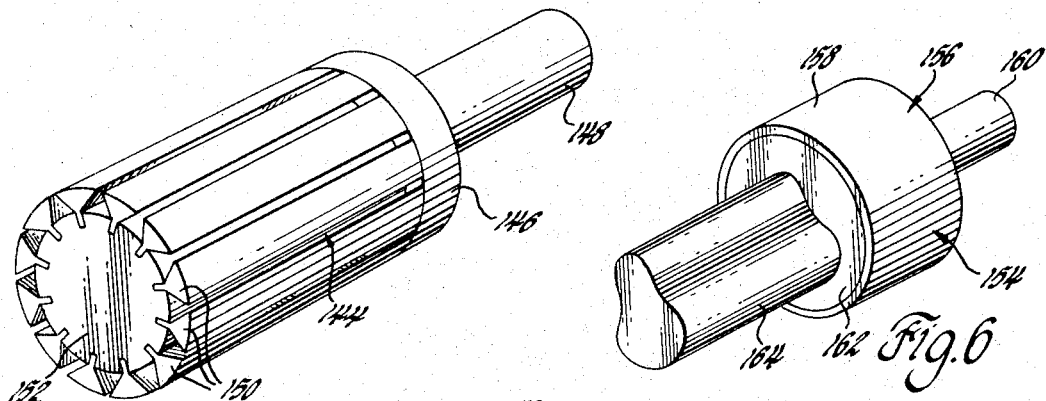
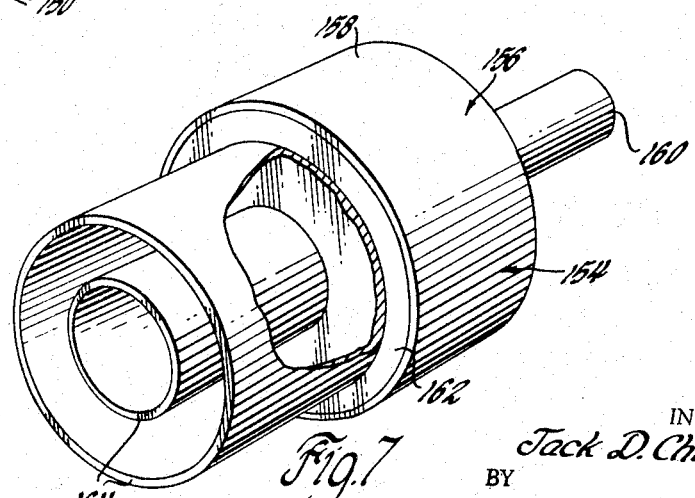
INVENTOR.
Jack D. Christenson
BY
ATTORNEY

United States Patent Office 3,322,185
Patented May 30, 1967

3,322,185
METHOD OF MAKING ELECTRICAL DISCHARGE MACHINING ELECTRODES
Jack D. Christenson, Brookfield, Wis., assignor to General Motors Corporation, Detroit, Mich., a corporation of Delaware
Filed Apr. 22, 1963, Ser. No. 274,672
2 Claims. (Cl. 164—111)

This invention relates in general to electrical discharge machining devices. More particularly, this invention relates to electrical discharge machining electrodes and an improved method of making the same to reduce the cost of electrical discharge machining operations.

In electrical discharge machining, the metal tooling portion of the electrode is provided wtih a working face having the desired configuration to which a surface of the metal workpiece is to be conformed. The electrode and workpiece are associated with an electrical circuit which includes an electrical power source. When the working face of the tooling portion of the electrode and the selected surface of the workpiece to be machined are brought into a predetermined spaced relationship in a dielectric medium, a series of electrical sparks are discharged across the gap between the working face of the electrode and the surface of the workpiece. These electrical sparks erode the metal of the workpiece, thereby machining or shaping the surface of the workpiece into conformance with the working face of the tooling portion of the electrode. The dielectric fluid is circulated between and around the working face of the electrode and the machined surface of the workpiece to prevent the overheating of both the electrode and the workpiece, and to carry away the metal removed therefrom.

One of the problems posed in this type of metal working is that, although the electrical sparks or discharges remove the metal of the workpiece, they also erode the tooling portion of the electrode so that the working face of the electrode is eventually destroyed or seriously impaired. It has been the usual practice to individually machine the tooling portion of each electrode to form the working face of the electrode. In most cases, the metal tooling portion is an integral part of the electrode body. Thus, the entire electrode must frequently be replaced during the shaping or machining of a workpiece when the tooling portion of the electrode has been sufficiently eroded to destroy the working face.

Therefore, it is apparent that when the working face, which is formed by the tooling portion of the electrode, has a complex surface, the electrode is relatively expensive to manufacture, since a substantial amount of machining and hand finishing is required. Since such an electrode still has a relatively short working life, the necessity of individually machining replacement electrodes contributes greatly to the overall cost of electrical discharge machining operations. Moreover, while electrodes made of certain metals, such as tungsten and the like, are capable of relatively long use, these electrodes are extremely difficult to produce and relatively expensive.

Therefore, it is a principal object of the present invention to provide a composite electrical discharge machining electrode, which is relatively inexpensive to produce, having an expendable tooling portion and reusable parts.

It is another object of the present invention to provide a method of producing electrical discharge machining electrodes by a relatively inexpensive casting process which obviates the necessity of individually machining the electrodes, thereby reducing the overall cost of electrical discharge machining operations.

It is a further object of the present invention to provide an inexpensive method of forming exactly reproducible composite electrodes having intricate tooling configurations in which a wide variety of electrode tooling materials may be used.

In accordance with the present invention, these and other objects are attained by providing a mold assembly to form a composite electrical discharge machining electrode by a casting process. The composite electrode formed by this process includes expendable metal tool parts which form the working face of the electrode and a permanently formed reusable metal shank for positioning the electrode in an electrical discharge machining fixture. The tool parts of the electrode and the shank are suitably positioned in a casting cavity in a mold assembly, and a cast metal body is formed in the cavity to bond the tool parts and the shank to form an integral composite electrode assembly. This cast body is made of a low melting point metal so that it may be easily melted for reuse in forming new electrodes when the tool parts of the electrode are eroded in the machining process.

Other features and advantages of the present invention will be apparent from the following description of certain embodiments thereof, taken in conjunction with the accompanying drawings, in which:

FIGURE 4 is a cross-sectional view of the mold assembly taken along the line 4—4 of FIGURE 3;

FIGURE 5 is a perspective view of a modification of the electrode embodying the present invention;

FIGURE 6 is a perspective view of another modification of the electrode embodying the present invention; and FIGURE 7 is a perspective view with parts broken away and in section, of still another modification of the electrode embodying the present invention.

Figure 1:
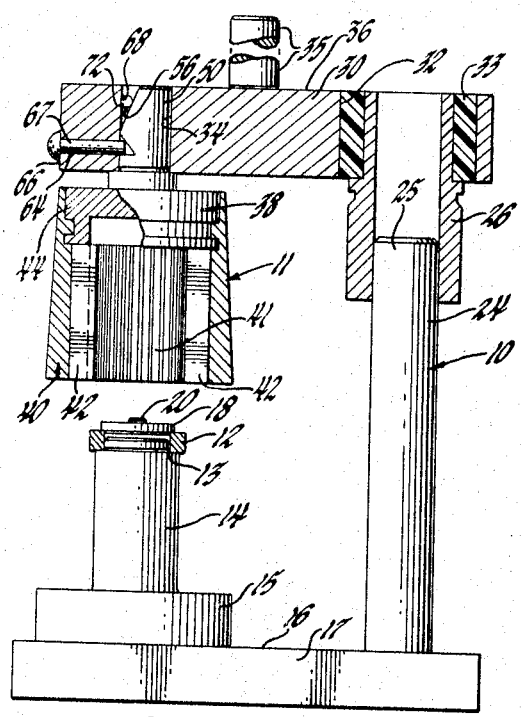
FIGURE 1 is a vertical elevational view, with parts broken away and in section, of an electrical discharge machining apparatus embodying the present invention.

Referring to FIGURE 1 of the drawings, an apparatus is shown which includes a fixture 10 and an electrode 11 for forming a plurality of axially extending slots around the outer periphery of a ring-shaped workpiece 12 by an electrical discharge machining process. As will hereinafter be more fully explained, the electrode and the workpiece are detachably connected to different parts of the fixture. The annular workpiece is snugly positioned around the cylindrical relief portion 13 at the top of a generally cylindrical metal stand 14. The stand is provided with an enlarged base section 15 which is affixed to the top surface 16 of a flat metal base plate 17. The workpiece preferably is securely held in position during the machining process by any suitable means, such as a disc-shaped clamp 18 fastened to the relief portion 13 of the stand 14 by means of a pin or set screw 20. The clamp preferably is made of an electrical nonconducting material, such as nylon, to prevent erosion of the clamp during the machining process.

A vertically extending metal pole 24 is mounted near one end of the base plate 17. The upper free end of the pole extends into and is vertically slidable within an annular collar 26 which is affixed to an annular bushing 33 provided in a bore 32 in a laterally extending metal arm or shoe 30. As will hereinafter be more fully explained, the shoe is adapted to hold the electrode 11 in the proper machining position over the workpiece 12 by vertically sliding the shoe on the pole during the machining process. Preferably, the shoe is prevented from pivoting on the pole so that the vertical alignment of the electrode and the workpiece may be accurately maintained during the machining process. This may be accomplished by any suitable means, such as by slidably mounting the shoe on another vertically extending pole which is not shown in the drawings.

The electrode 11 and the workpiece 10 are electrically connected to an electrical power source by any suitable means which is not shown in the drawings. Therefore, the shoe 30 preferably is electrically insulated from the pole 24 by any suitable means, such as using an epoxy-lined bushing 33 in the bore 32 to prevent the short circuiting of the electrical current in the fixture during the machining process.

As previously mentioned, the electrode 11 is attached to the shoe 30 and movable therewith so that the electrode may be brought into the desired spaced relationship with the workpiece during the machining process. As will hereinafter be more fully explained, the electrode 11 is detachably connected to the shoe by a locking means provided in an opening 34 in the shoe directly above the workpiece. A vertically extending knob or rod 35 is provided on the top surface 36 of the shoe 30 for vertically moving the shoe by any suitable mechanical means, which is not shown in the drawings.

Figure 2:
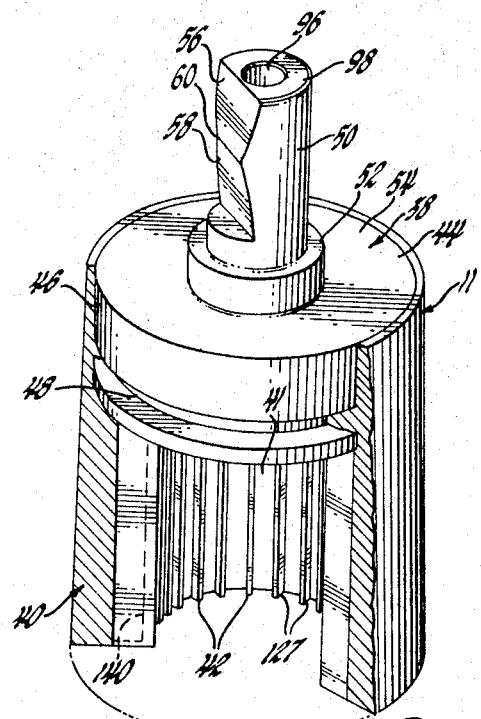
FIGURE 2 is a perspective view, with parts broken away and in section, of the composite electrode in the apparatus shown in FIGURE 1.

As is clearly shown in FIGURE 2 of the drawings, the electrode 11 which is used in the apparatus shown in FIGURE 1 includes a metal shank 38 which is bonded to a hollow frusto-conical cast metal body 40 having a generally cylindrical chamber 41 therein. As will hereinafter be more fully described, a plurality of axially extending, elongated, rectangular metal tool strips 42 having a rectangular cross section are located around the interior of the hollow cast metal body 40 in the desired spaced relationship and are partially embedded in the inner cylindrical face of the body. The exposed surfaces of the strips 42 provide the working surfaces of the electrode for machining the slots around the periphery of the annular workpiece 12, which is shown in FIGURE 1 of the drawings.

The shank 38 includes a generally cylindrical base section 44. The outer cylindrical surface 46 of this base section is provided with an annular groove 48 into which the cast body 40 extends to improve the structural strength of the electrode. The shank member 38 has a generally cylindrical stem portion 50 extending vertically from an enlarged generally cylindrical relief portion 52 which is located on the top surface 54 of the base section 44. One side of the stem portion 50 is provided with a generally flat sloping upper surface 56 and a generally flat sloping lower surface 58. The surfaces 56 and 58 intersect along a line to form a transversely extending, outwardly protruding apex 60 on the side of the stem portion 50. These surfaces are adapted for the selective insertion and locking of the electrode in the opening 34 in the shoe 30 of the fixture 10 shown in FIGURE 1 of the drawings.

Referring to FIGURE 1 of the drawings, the shoe 30 is provided with a small diameter opening 64 extending transversely through the lower portion of the end surface 66 of the shoe into the opening 34. A removable dowel pin 67 is inserted in the opening 64 to frictionally engage the flat lower sloping surface 58 of the stem 50 of the electrode 11. Similarly, a small diameter opening 68 extends transversely through the upper portion of the shoe 30 and the opening 62 in a direction perpendicular to the opening 64. A removable dowel pin 72 is inserted in the opening 68 and frictionally engages the flat upper sloping surface 56 of the stem portion 50 of the electrode 11. The dowel pins 67 and 72 function together to lock the stem 50 of the electrode within the opening 34 of the shoe and to prevent rotational and vertical movement of the electrode during the machining process.

As previously mentioned, the workpiece 12 and the electrode 11 are connected to an electrical power supply by any suitable means, which is not shown in the drawings. During the electrical discharge machining process, the electrode and the workpiece are brought into the desired spaced relationship and a dielectric liquid medium is circulated through the gap between the working surfaces of the electrode and the adjacent surfaces of the workpiece to be machined. When a voltage potential is impressed across the gap between the electrode and the workpiece, electrical sparks are discharged from the working surfaces of the electrode which erode the adjacent surfaces of the workpiece. As previously mentioned, there is also some erosion of the working surfaces of the electrode during the machining process. The eroded portions of the workpiece conform to the pattern of the working surfaces of the electrode. The circulating dielectric fluid carries away the eroded particles of the workpiece and the electrode and also prevents overheating of the electrode and workpiece during the machining operation.

By utilizing the electrode shown in FIGURE 2 of the drawings, a plurality of slots may be formed around the outer periphery of the ring-shaped workpiece shown in FIGURE 1 of the drawings. As will hereinafter be more fully explained, only the exposed portion of the tooling strips 42, which form the working surfaces of the electrode, are eroded during the machining process, and the shank 38 and the metal material forming the cast body 40 may be reused to form new electrodes. As the exposed portions of the strips nearest to the workpiece are progressively eroded during the machining process, the shoe 30, which holds the electrode, is caused to slide down the pole 24 to maintain the desired spaced relationship between the uneroded working surfaces of the electrode and the surfaces of the workpiece to be machined.

Figure 3:
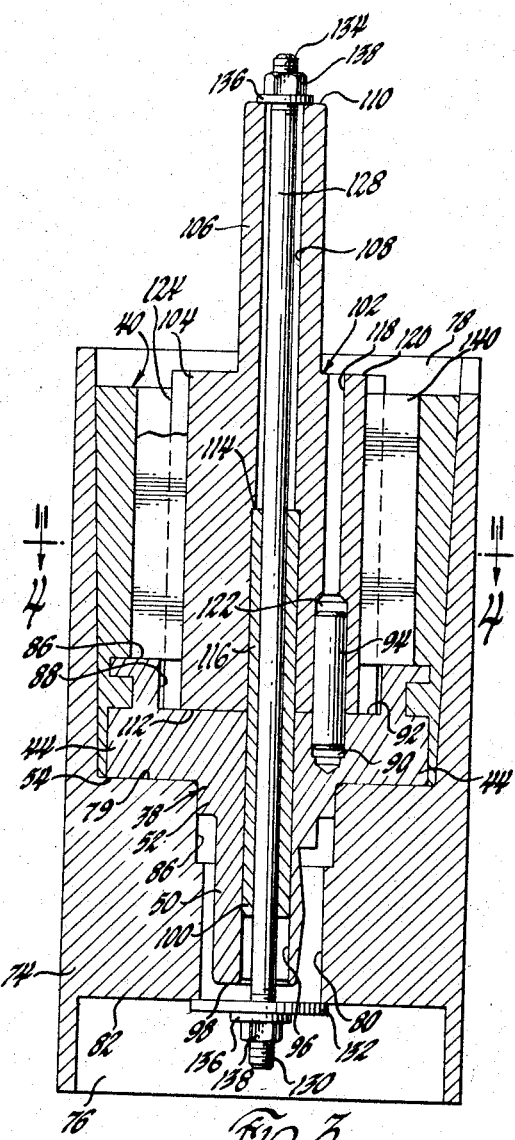
FIGURE 3 is a vertical sectional view of the mold assembly used in forming the electrode shown in FIGURE 2.

FIGURE 3 of the drawings shows the mold assembly used to form the electrode shown in FIGURE 2. A generally cylindrical mold sleeve 74 is provided with a relatively shallow cylindrical-shaped cavity 76 in its lower portion and a relatively deep frusto-conical shaped casting cavity 78 in its upper portion. The casting cavity 78 tapers outwardly from its bottom surface 79 to facilitate removal of the electrode 11 from the sleeve when the casting process is completed. It should be appreciated, of course, that the electrode is formed in an inverted position in the mold sleeve to facilitate the casting process.

The sleeve 74 is provided with an opening 80 extending axially from the cavity 76 to the cavity 78. The opening 80 is enlarged at 86 adjacent the casting cavity 78 to facilitate the snug positioning of the shank 38 of the electrode within the cavity 78 during the casting process.

In assembling the mold assembly, the flat surface 54 of the base section 44 of the shank 38 is firmly seated on the flat bottom 79 of the cavity 78 so that the cylindrical relief portion 52 of the shank is snugly positioned in the enlarged opening 86 in the sleeve 74 and the stem 50 of the shank protrudes into the opening 80. The surface 86 of the shank is provided with a cylindrical recess 88 in axial alignment with the stem. A bore or opening 90 is provided in the surface 92 of the shank defining the base of the recess 88 for receiving a cylindrical locating pin 94 at a suitable distance from the cylindrical opening 96 which extends axially through the shank member 38. The opening 96 extends through the top surface 98 of the stem 50 and the surface 92 of the recess 88 for receiving a tubular metal alignment sleeve 100. As will hereinafter be more fully explained, the locating pin and the alignment sleeve extend from the openings 90 and 96, respectively, in the shank member 38 into adjacent openings in the metal mandrel 102 to aid in properly locating the mandrel within the mold assembly.

The mandrel 102 has a generally cylindrical body portion 104 and a tubular stem portion 106 extending from one end of the body portion. The mandrel is provided with a cylindrical opening 108 which extends axially through the top surface 110 of the mandrel stem 106 and the opposite flat end surface 112 of the mandrel body 104. The portion of the opening 108 adjacent the end surface 112 of the mandrel body 104 is enlarged to receive the alignment sleeve 100. The sleeve abuts the annular shoulder 114 formed by an enlarged opening 116 in the body portion 104 of the mandrel 102. As will hereinafter be more fully explained, the mandrel 102 may be removed from the molded assembly and electrode after the casting process has been completed by jarring the sleeve 100 against the annular shoulder 114 in the mandrel body 104.

An opening 118 is provided in the mandrel body 104 which extends through the end surface 120 of the body adjacent the stem portion 106 of the mandrel and the opposite end surface 112 of the mandrel body. The opening 118 is located in the mandrel body at the same spaced relationship from the axis of the opening 108 of the mandrel as the opening 90 in the shank 38 is spaced from the axis of the opening 96 in the shank. The opening 118 has an enlarged portion 122 adjacent the end surface 112 of the mandrel body for receiving a portion of the locating pin 94, so that the mandrel and shank may be accurately aligned within the mold assembly.

As shown in FIGURE 4 of the drawings, the outer cylindrical surface 124 of the mandrel body 104 is provided with a plurality of axially extending slots or grooves 126 having a rectangular cross section. The grooves are located in the desired spaced relationship around the periphery of the mandrel body for receiving portions of the rectangular electrical conducting metal strips 42. The depth of the grooves is such that only portions 127 of the strips extend into the grooves. These portions of the strips form the working face of the electrode 11 when the casting process is completed and the mandrel is removed. The strips 42 may be made of any suitable electrical conducting metal such as brass, copper, tungsten carbide and the like.

Referring to FIGURE 3 of the drawings, the shank 38, mandrel 102, alignment sleeve 100 and the locating pin 94 are positioned in the mold sleeve 74 in the manner previously described. However, prior to positioning these parts in the mold assembly, the mandrel and the surfaces of the casing cavity 78 preferably are treated with a mold release agent, such as a silicone oil, to facilitate removal of the electrode 11 from the mold assembly after the casting process has been completed.

After the mandrel 102, shank 38, sleeve 100 and pin 94 are positioned in the mold sleeve 74 in the previously described manner, they are securely fastened to one another and to the mold sleeve by means of an elongated pin 128. The pin 128 is threaded at both ends and extends through the openings 108 in the mandrel stem 106 and the opening 96 in the stem 50 of the shank. Of course, the pin 128 also extends through the hollow alignment sleeve 100 which is located in the opening 96 of the shank and the enlarged opening 116 of the mandrel body. The threaded lower end 130 of the pin 128 is provided with a relatively large washer 132 which abuts the bottom surface 82 of the cavity 76. The pin 128 is securely fastened at its upper end 134 to the top surface 110 of the mandrel stem 106 and at its lower end 130 to the washer 132 by means of washers 136 and threaded nuts 138.

The electrical conducting metal strips 42 are positioned in the grooves 126 of the mandrel 102 in the aforementioned manner so that the strips partially extend into the open mold cavity 78 and the ends of the strips abut the annular surface 86 of the base section 44 of the shank member 38. When the various parts of the electrode and mold assembly have been assembled in the aforementioned manner, the assembly is ready for the casting process. In the casting process, the portions 140 of the strips 42 which extend into the casting cavity 78 are bonded to the shank 38 in a cast metal body 40 to form the electrode 11.

The low melting point alloy of which the body 40 is formed is melted and poured into the casting cavity 78. The mold is subsequently cooled to solidify the melt and form the cast body 40. The metal forming the casting body is not limited to any specific composition or alloy. However, this metal preferably should have good electrical conductance and a melting point in the range of about 150° F. to 500° F. By using a metal having a relatively low melting point, the cast metal body of the electrode may be conveniently melted for reuse in forming new electrodes. Thus, the use of a relatively inexpensive alloy having a low melting temperature, such as a zinc-tin or bismuth-lead alloy, in forming the cast metal body 40 provides an obvious advantage of the present invention. After the working face of the electrode formed by the exposed portion 127 of the metal strips has been eroded in the machining process, the cast body may be easily remelted and recovered and the shank 38 may be removed from the melt for reuse in forming new electrodes.

Thus, the shank and the metal or alloy material forming the casting body 40 of the electrode may be used repeatedly in the mold assembly previously described to form new electrodes, since only the electrical conductor strips are eroded during the machining process. Obviously, this process of forming electrical discharge machining electrodes is much less expensive than individually machining new electrodes as has been done in the past. Also, a wide variety of electrodes having intricate working face configurations may be formed by the molding process of the present invention.

In the preferred embodiment of the present invention, the electrode shown in FIGURE 2 of the drawings may be conveniently formed by the above-described casting process by using the mold assembly shown in FIGURE 3 of the drawings. The various parts of the mold assembly may be made of steel or other suitable high melting point material. The shank of the electrode may be formed of an electrical conducting metal such as SAE 1020 steel. The tooling strips which form the working face of the electrode may be made of standard brass shim stock. The various parts of the mold assembly are assembled in the above-described manner, and the casting cavity 78 and mandrel 102 are lubricated with a suitable silicone mold release agent to facilitate removal of the electrode from the mold assembly and the mandrel from the electrode after the casting process is completed.

As previously mentioned, the material used in forming the molded casting body of the electrode is not limited to any specific composition. However, I have found that an electrically conductive alloy composed of about 50% bismuth, 26.6% lead, 13.3% tin and 10% cadmium is especially suitable. This alloy may be melted at a temperature slightly above its 158° F. melting point and poured into the cavity 78 of the mold assembly. The mold is subsequently cooled to cause the molten alloy to solidify. Next, the electrode 11 and mandrel 102 are removed from the mold, and the mandrel is subsequently removed from the electrode. The alignment sleeve 100 and reference pin 94 are also removed from the electrode. Of course, the mandrel and the other parts of the mold assembly may be reused to form new electrodes by the molding process of the present invention.

FIGURE 5 of the drawings shows a modification of an electrode which may be produced by the casting process of the present invention. The electrode 144 includes a generally cylindrical metal shank 146 having a stem portion 148 and a plurality of axially extending irregular shaped elongated metal tool parts 150 which are partially embedded in a generally cylindrical cast metal body 152. The tooling parts 150 are located around the outer cylindrical surface of the body in the desired spaced relationship, and the exposed surfaces thereof provide the working face of the electrode. The cast body 152 is bonded to the base section of the shank 146. It should be appreciated that the mold assembly used to produce this electrode would be different than that employed to produce the electrode shown in FIGURE 2 of the drawings. However, the casting process would be essentially the same. Also, the shank and tool parts of this electrode could be reused to form new electrodes since only the tool parts are expended during the machining process.

FIGURE 6 of the drawings shows another modification of an electrode which may be produced by the molding process of the present invention. The electrode 154 includes a shank member 156 having a hollow generally cylindrical base section 158 and a stem portion 160. The hollow base section 158 of the shank may be used as the casting cavity in forming the cast metal body 162. An irregular shaped tool part 164 is partially embedded in the cast metal body 162 which substantially fills the hollow base section 158 of the shank 156. It will be appreciated, of course, that the exposed portion of the tool part 164, which provides the working face of the electrode, may have any desired configuration. The mold assembly used in forming this electrode would be different than that employed to produce the electrode shown in FIGURE 2 of the drawing. However, the casting process would be essentially the same. Also, the shank and cast body can be reused to form new electrodes, since only the tooling part is expended in the machining process.

FIGURE 7 of the drawings shows another modification of an electrode which is similar to the electrode shown in FIGURE 6 of the drawings, and like parts are indicated by the same reference numerals. This electrode may be used to machine concentric circles in a workpiece.

Thus, the process of the present invention provides a method of producing electrical discharge machining electrodes by a molding technique which obviates the necessity of individually washing each electrode, thereby reducing the overall costs of electrical discharge machining operations. Moreover, the shank member and the alloy or metal casting material may be repeatedly used to form new electrodes, since only the tooling portion of the electrode produced by the subject process is expended during the machining operation. Also, exactly reproducible electrodes may be manufactured by repeatedly using the same mold assembly to form new electrodes. In addition, electrical discharge machining electrodes having many different and intricate configurations may be produced by the subject process without the necessity of individually machining each electrode.

While I have described my invention in terms of particular embodiments, it is not intended to be limited thereby, and it should be understood that other variations may be apparent to those skilled in the art and are within the intended scope of my invention as defined by the following claims.

I claim:
1. A method of forming a composite electrode by a casting process for use in an electrical discharge machining device, said method comprising the steps of providing a reusable metal shank, said shank having a generally cylindrical base section and a stem portion extending from one end of said base section for selective insertion of said electrode into said device, providing a plurality of expendable copper base alloy tool parts, providing a mold sleeve having a casting cavity therein, providing a reusable metal mandrel to aid in positioning said parts within said casting cavity, said mandrel being formed with contoured surfaces to which the working face of the electrode is to be conformed, positioning said parts and said mandrel in said cavity so that the surfaces of said parts abut said surfaces of said mandrel in the desired spaced relationship to form the desired working face configuration of said electrode and portions of said parts to extend into said cavity, positioning said shank within said cavity, lubricating said surfaces of said mandrel and the surfaces of said sleeve defining said casting cavity with a mold release agent, melting an alloy material, said alloy having a melting temperature in the range of 150° F. to 500° F. so that said alloy may be easily melted for reuse in forming new electrodes, pouring said molten alloy into said cavity, cooling said alloy to form a cast body which bonds said base section of said member and said portions of said parts extending into said cavity to form an integral electrode assembly, removing said electrode from said cavity, and subsequently removing said mandrel from said electrode to expose said working face of said electrode.

2. A method of forming a composite electrode by a casting process for use in an electrical discharge machining device to machine a plurality of slots in the outer peripheral surface of a generally cylindrical workpiece, said method comprising the steps of providing a reusable metal shank, said shank having a generally cylindrical base section and a stem portion extending from one end of said base section, said stem portion being contoured for selective insertion of said electrode into said device, providing a plurality of rectangular shaped expendable copper base alloy tool strips, providing a mold sleeve having an outwardly tapering frusto-conical shaped casting cavity therein, providing a generally cylindrical reusable metal mandrel to aid in positioning said strips within said mold cavity, said mandrel having axially extending grooves in the outer cylindrical surfaces thereof for receiving portions of said strips, positioning said portions of said strips within said grooves of said mandrel so that said portions of said strips provide the exposed working face of said electrode to machine said slots in said workpiece, lubricating said grooves of said mandrel and the surfaces defining said mold cavity with a mold release agent, positioning said shank, mandrel and strips within said cavity so that portions of said strips extend from said grooves in said mandrel into said cavity, heating an alloy material to form a melt, said alloy having a melting temperature in the range of 150° F. to 500° F. so that said alloy may be easily melted for reuse along with said shank in forming new electrodes when said strips have been eroded in the machining process, pouring said alloy into said cavity, cooling said alloy to form a cast body, said body bonding said base section of said shank and said portions of said strips extending into said cavity to form said composite electrode, removing said electrode from said cavity, and subsequently removing said mandrel from said electrode to expose said working face of said electrode.

References Cited

UNITED STATES PATENTS

| | | | |
|---|---|---|---|
| 1,866,602 | 7/1932 | Ridgeway et al. | 22—203 |
| 2,785,280 | 3/1957 | Eisler et al. | 219—69 |
| 2,800,566 | 7/1957 | Matulaitis | 219—69 |
| 2,909,641 | 10/1959 | Kucyn | 219—69 |
| 3,098,148 | 7/1963 | Piot et al. | 219—69 |
| 3,200,231 | 8/1965 | Bejat | 219—119 |

RICHARD M. WOOD, *Primary Examiner.*

R. F. STAUBLY, *Assistant Examiner.*